Patented Feb. 25, 1941

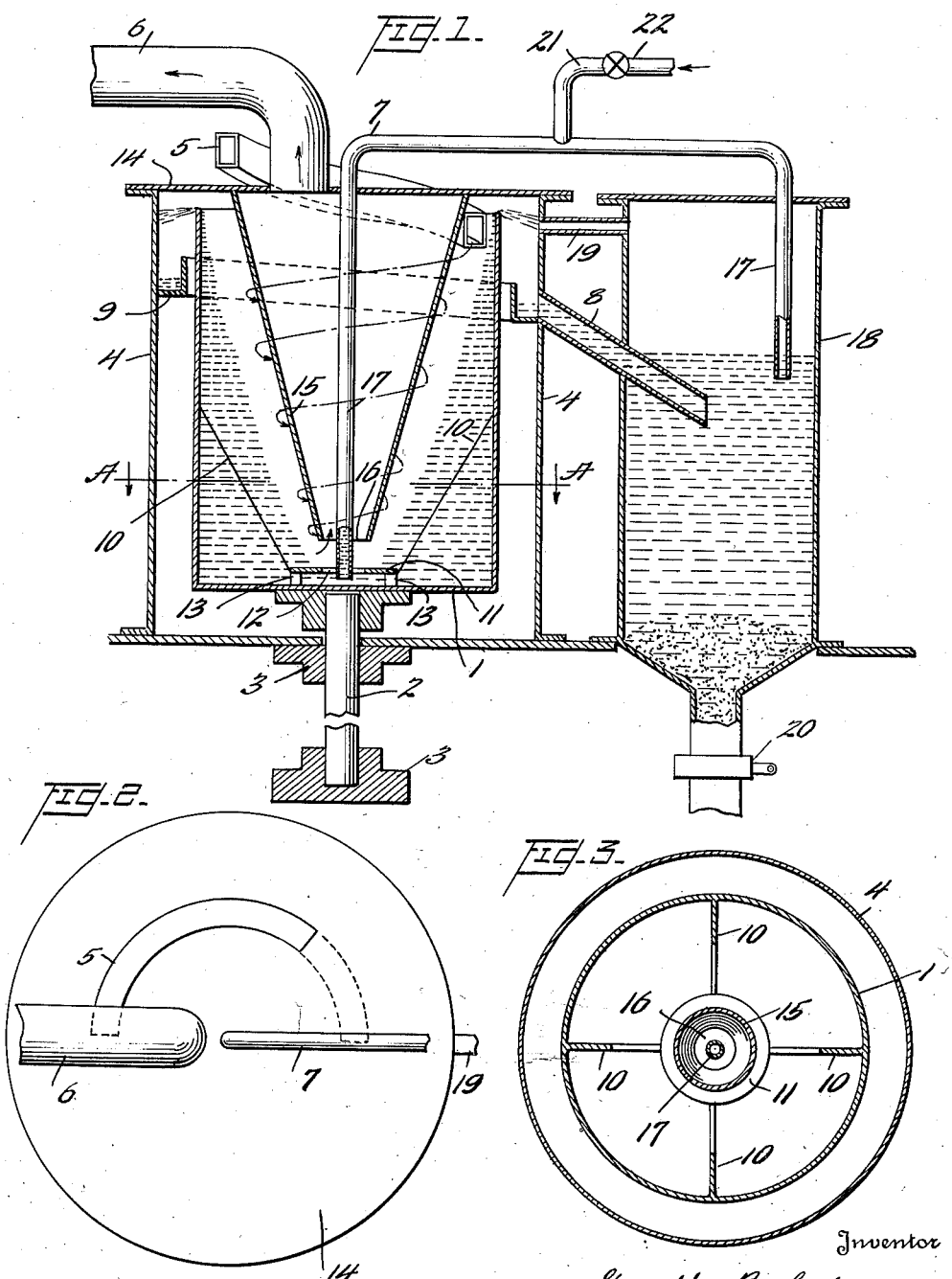

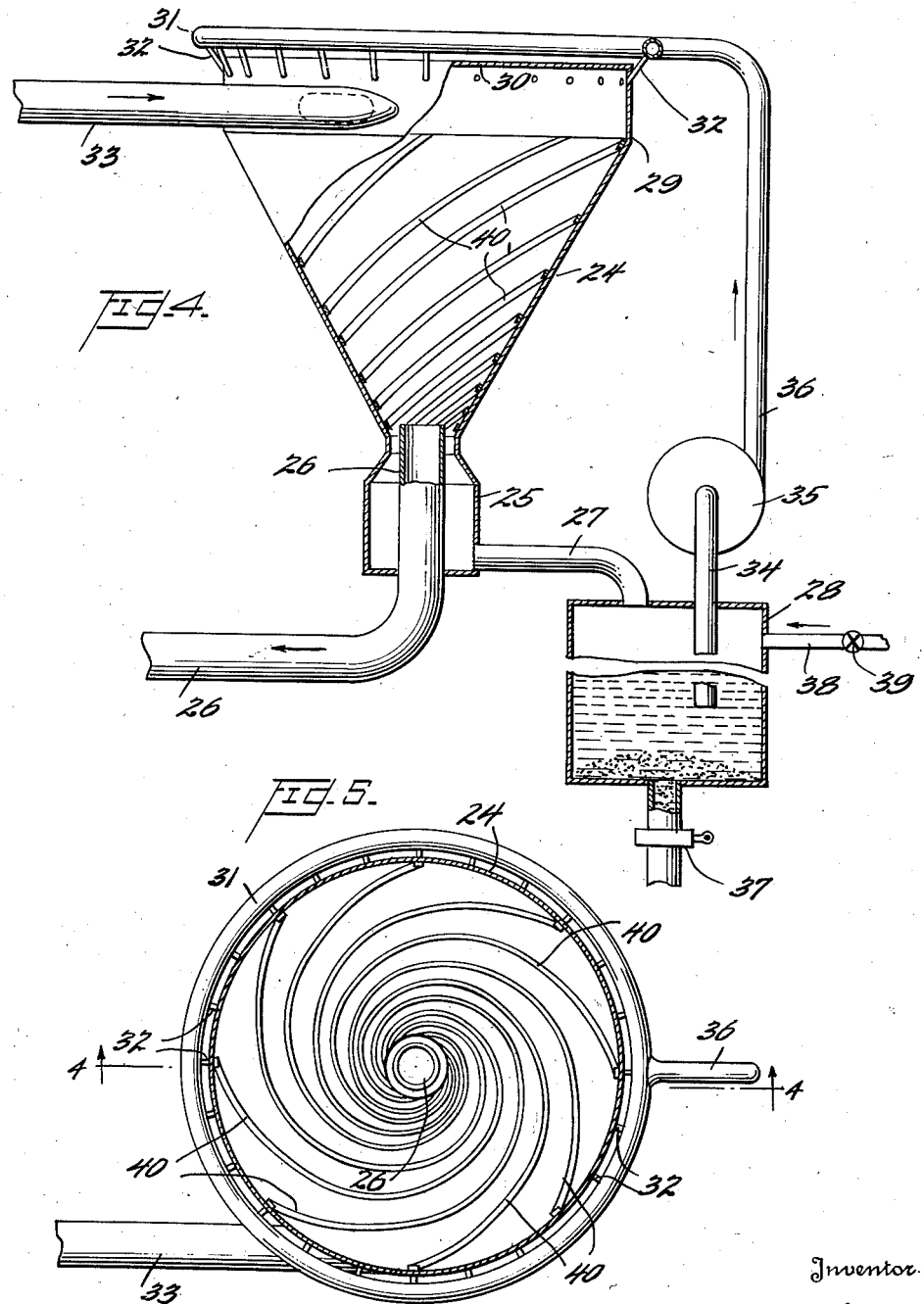

2,233,019

UNITED STATES PATENT OFFICE 2,233,019

DUST COLLECTOR

Garrett B. Linderman, Jr., Washington County, Md.

Application April 12, 1939, Serial No. 267,484

10 Claims. (Cl. 261—79)

This invention relates to methods of and apparatus for effecting the rapid and economical separation from a gas of particles of solid matter held in suspension thereby. It is adapted for use in the removal of such particles from many types of gases but is particularly well suited for use in removing dust from atmospheric air.

The apparatus contemplated by the invention may be made in various sizes, small sizes for household use and large sizes for commercial installations and in either case is of extreme simplicity, rugged and durable in use and inexpensive to install and maintain in operation. In accordance with the invention, the gas which contains the dust particles or foreign bodies is caused to revolve at high velocity about an axis, thus throwing the contained solid particles outwardly toward the periphery of the revolving gaseous body by centrifugal action. Enveloping the body of whirling gas is a liquid film and the solid particles thus thrown outwardly by the gas strike and are entrapped by the liquid film, in this manner practically all of such particles being removed from the gas and entrapped by the liquid. Preferably the apparatus is so designed that the operation may be carried on continuously, a stream of gas being caused to enter the apparatus at one point, thereafter caused to rapidly whirl to effect discharge of its contained particles, and being withdrawn from the apparatus at another point, the liquid of the enveloping film likewise being continuously replaced. The apparatus is thus capable of serving continuously in the purification of the air introduced into a dwelling house, apartment, theatre or commercial plant, and effects a high degree of purification of the air.

Within the scope of the invention the method may be considerably modified in minor respects and various forms of apparatus for practicing the method may be devised. In the accompanying drawings two such forms of apparatus are illustrated by way of example.

In the drawings:

Figure 1 shows in vertical section the principal elements of the apparatus and likewise the piping and connections for the gas and liquid which pass through the same;

Figure 2 is a top plan view of one of the units shown in Figure 1;

Figure 3 is a section on the line a—a of Figure 1;

Figure 4 shows in vertical section two of the principal elements of a modified form of apparatus for practicing the method; and Figure 5 is a top plan view of the same.

That form of the apparatus which is shown in Figures 1, 2 and 3 will first be described. A cylindrical container, revoluble about a vertical axis, is indicated at 1, this container being open at the top and having its bottom closed, the container being mounted upon the upper end of a vertically disposed shaft 2, revolubly mounted in bearings such as diagrammatically indicated at 3, so that the container may be freely revoluble but is not axially movable. Enveloping the container is a stationary cylindrical housing 4, the top and bottom of which is closed. Passing through the top of the housing 4 is a tubular conduit of gas, indicated at 5, this conduit being curved and so disposed as to discharge a stream of gas under high velocity into the container 1, at or close to its upper end and at a point closely adjacent the inner wall surface of the container. The top of the housing is likewise provided with a gas discharge aperture with which the end of a gas discharge conduit 6 is in register.

A liquid conduit is indicated at 7, this conduit passing through the top of the housing 4 and extending downwardly into the container 1. A liquid outlet from the housing 4 comprises the tubular member 8 which leads downwardly and outwardly and is adapted to conduct away from the housing 4 the liquid which collects in the annular tough 9 which encircles the container 1. Within the container 1 are positioned the triangular radial vanes or partitions 10, these vanes or partitions being rigidly secured in the positions in which they are shown in Figure 1. An annular plate 11, disposed coaxially of the container 1 and horizontally disposed is supported upon the bottom of the container 1 by a plurality of legs 13, the central opening in this plate being indicated at 12. To the undersurface of the top 14 of the housing 4 is secured the upper edge of a hollow frusto-conical member 15. The opening at the bottom or small end of the frusto-conical member is indicated at 16 and the liquid conducting pipe 17, which comprises a continuation of the conduit 7, projects downwardly through opening 16 and likewise through the opening 12 in the plate 13. Conduit 17 is disposed axially of the container 1.

To one side of the housing 4, and disposed approximately at the same level, is a tank 18, this tank containing the liquid which is made use of in the separation process. It will be observed that the conduit 7 has a second branch 17' which extends downwardly into tank 18 through an opening in its top, the outlet or discharge end of conduit 17' being well below the level of the liquid in the tank. A pipe 19 connects the upper part of the housing 4 to the upper part of the tank 18, this pipe being provided to ensure equalization of pressures existing within the housing and the tank respectively. Tank 18 terminates in a discharge conduit extending downwardly from its bottom, which conduit is normally closed by a valve 20, but which valve may be opened from time to time to permit discharge of liquid, together with the dust particles collected. A liquid inlet 21 is connected to pipe 7, inflow of liquid through this conduit being controlled by valve 22, and it is through conduit 21 that a fresh supply of liquid may be introduced into the system to replace liquid lost by evaporation or by removal through the drainage duct controlled by valve 20. As a step preliminary to the operation of this form of the invention, liquid is first admitted into the apparatus through the pipe 21 until the container 1 is approximately one half full, this container being stationary during the filling operation, the tank 18 being naturally filled to the same level at the same time. It will be understood that in doing this, all of the gas in the manifold 7 and connected pipes 17 and 17' will be driven out. After a sufficient amount of liquid has thus been introduced into the apparatus the valve 22 is closed so that the conduits 7, 17 and 17' together constitute a syphon. Shaft 2 is now driven by a suitable motor or the like to cause container 1 to be rotated at high angular velocity or until the liquid contained therein will be distributed over the inner side walls of the container substantially in the manner indicated in Figure 1 of the drawings, the liquid being thrown outwardly by a centrifugal force and the inner surface of the liquid assuming the shape of a paraboloid of revolution.

As the surface of the liquid, at the center of the container 1, falls, the pipe 7 will commence to function as a syphon, delivering liquid from tank 18 to the bottom and center of the container 1. The container 1 should be rotated at such a speed that the surface of the liquid therein will assume the shape of a paraboloid of revolution which will be tangent to the bottom of the container 1 when liquid is just overflowing from the upper edge of the container. As liquid is continuously supplied to the container through the syphon conduit from the tank 18, there will be a constant overflow from the upper edge of the container which overflow is collected in the trough 9 and is returned to the tank 18 through the return pipe 8. It will thus be understood that the circulation of the liquid will be continuous during the revolution of container 1. The partitions 10 are provided to ensure that the liquid within the container will rotate during the operation of the apparatus at the same speed as the container.

As has previously been explained, the gas, such as air, containing the suspended particles, is forced into the container 1 at its upper end at high velocity through the discharge nozzle 5, a fan or the like being employed to place the gas under the pressure necessary to obtain the required velocity. The container 1 is rotated, in the form of the invention shown in Figure 1, in a clockwise direction (looking down upon the top of the container) and the gas discharged by nozzle 5 is of course moving in the same direction. The gas moves downwardly in the container, between the surface of the stationary cone 15 and the surface of the liquid 23, the stream of gas following the path generally indicated by the chain lines and arrows in Figure 1, eventually reaching the opening in the bottom of the frusto-conical member 15. It will pass into the interior of this member 15 through the aperture 16 and rise through this member, eventually escaping through the outlet duct 6. The whirling of the gas about the central cone causes the suspended particles to be thrown outwardly by centrifugal action, such particles eventually coming into contact with the surface of the liquid and being immediately entrapped by such liquid. As the stream of gas approaches the lower end of the frusto-conical member 15 its radius of movement becomes less, thus greatly increasing the centrifugal force acting on the suspended particles.

As the liquid moves upwardly toward the rim of the container 1 it carries the entrapped particles with it, eventually carrying them over into tank 18 where they gradually settle to the bottom. The tank 18 can be made of any size desired and provided with suitable baffles, if necessary, to facilitate settling of the particles. From time to time these particles are removed from the bottom of the tank by the manipulation of the valve 20 and the liquid thus lost in the dumping operation being replaced in the supply pipe 21. The gas may be introduced through the nozzle member 5 at such high velocity that it may tend to rotate the liquid faster than the container 1 and thus change or alter the shape of the inner surface of the liquid. The partitions 10 are supplied to reduce this tendency. It is also the case that there may occur a substantial reduction of pressure at the lower end of the frusto-conical member 15 and when this happens there is a strong tendency for some of the liquid to pass upwardly into the cone 15. It is the function of the plate 12 to reduce or eliminate this tendency.

That form of the invention shown in Figures 4 and 5 will now be described. In this form the apparatus consists essentially of a stationary conical member 24 with axes disposed vertically and the apex or small end being lowermost. The opening in the lower end of the frusto-conical member is in communication with the upper end of a secondary chamber 25. An outlet for gas from which dust or particles has been removed is indicated at 26 and it will be perceived that this outlet is disposed axially of member 24 and projects upwardly through chamber 25 and into the lower end of the frusto-conical member 24, the upper end of conduit 26 being slightly above the most restricted diameter of the frusto-conical member 24. A liquid drain pipe is indicated at 27 and is shown to connect the chamber 25 to a tank 28, for the reception of liquid collected in chamber 25. Secured to the upper edge of the frusto-conical member 24 is a cylindrical member 29 surmounted by a closure plate 30. Encircling the cylindrical member 29 is a circular manifold 31 and extending downwardly and inwardly from this manifold into apertures formed in the cylindrical wall member 29 are a plurality of tubular conduits 32 of small diameter. A conduit for introducing gas into the chamber defined by the frusto-conical member 24, the cylindrical member 29, and the top 30, is indicated at 33, conduit 33 being so disposed as to discharge a stream of gas tangentially into the cylindrical member 29.

A liquid circulating pump is indicated at 35 and the inlet port of this pump is supplied with liquid from tank 28 through the conduit 34, which extends into tank 38 through an aperture in its top, the lower end of conduit 34 being at all times below the level of the liquid in this tank. The outlet port of pump 35 is connected by means of a conduit 36 with the manifold 31 and, when the pump 35 is in operation, liquid is lifted from the tank 28 to the manifold 31.

A discharge conduit extends downwardly from tank 28 but is normally closed by a valve 37. This valve may be operated to drain the tank whenever desired and to effect discharge of the collected dust particles. A liquid inlet pipe is indicated at 38, inflow of liquid into tank 38 through this pipe being controlled by a manually operable valve 39.

To the inner surface of the frusto-conical member 24 are riveted or otherwise suitably secured a plurality of strips indicated at 40, which may be designated ribs, and which spiral downwardly from the upper edge of the frusto-conical member in the same direction that the gas introduced through pipe 33 will flow toward the lower end of the separating chamber. In other words, if the gas inlet is arranged so as to cause a counter-clockwise whirl of the gas within the gas separating chamber (looking downwardly from the top as shown in Figure 5), the ribs also incline in a counter-clockwise direction from top to bottom. All of these ribs terminate at or close to the restricted port at the lower end of frusto-conical member 24. This embodiment of the invention is caused to operate as follows:

The tank 28 is completely filled with the liquid to be used, such for instance as water, and the pump 35 is then started. The liquid is thus delivered to the manifold 31 from which it is conducted to the inner surface of the cylindrical section 29 of the separating chamber through the pipes 32. The pressure of the pump and the dimensions of the water conducting pipes, including pipes 32, are so regulated that the water issuing to the separating chamber into the pipes 32 will simply trickle down the inner wall surface of the cylindrical surface 29 instead of being projected into the interior of the chamber in the form of streams.

Such water introduced into the separating chamber will continue downwardly, flowing over the frusto-conical inner surface of member 24 and finally reaching chamber 25, from which it is removed to tank 28 through pipe 27.

As has previously been explained, gas is projected from the gas discharge tube 33 into the separating chamber at high velocity which causes such gaseous stream to describe a spiral path downwardly from the top of the separating chamber to the inlet port of the gas discharge pipe 26. The friction of the gas against the liquid film on the inside of the frusto-conical member 24 tends to drive the liquid around on the inner surface of member 24 in the same direction. Centrifugal force maintains the liquid film in contact with the inner surface of member 24 and the ribs or strips 40 function to direct the liquid downwardly, these ribs serving as guiding vanes. Without the ribs or strips 40, and in the event that the rotational velocity acquired by the liquid under the influence of the gas was sufficiently high, the liquid would be forced upwardly over the frusto-conical inner surface of member 24 and thus proper circulation of the liquid in the system prevented. It is not absolutely necessary that the ribs or strips 40 be spirally disposed as illustrated, although this is preferred and most efficient. Strips disposed in vertical planes will function in a satisfactory manner. As the gas rotates in its passage from conduit 33 to conduit 26, or whirls rapidly within the operating chamber, the suspended solid particles therein are thrown outwardly by centrifugal action and contact with the liquid film flowing over the inner wall surface of the separating chamber, being thus captured by such liquid, the functioning of this form of apparatus being substantially the same as of the form of the apparatus first described.

In neither form is there employed any complicated mechanism. A simple and inexpensive form of fan may be employed to drive the air to be cleaned into the separating chamber. In the form of the invention shown in Figures 4 and 5 a simple form of liquid pump is shown but in the form of the invention shown in Figures 1, 2 and 3 the container 1 functions as a pump for elevating the liquid.

It will be clear to one skilled in the art that further modified forms of apparatus, all capable of carrying out the improved process may be devised, and that those forms of the invention which are illustrated and described are given by way of example only.

Having thus described the invention, what is claimed as new and desired to be secured by Letters Patent is:

1. The method of removing suspended particles from a gas which comprises causing a stream of such gas to move at high velocity about an axis in a generally helical path of progressively decreasing radius, whereby its contained particles are thrown outwardly by centrifugal action with progressively increasing force, and maintaining an envelope of liquid around the moving gaseous stream in close proximity to the outer confines of the said helical path to receive and entrap such particles.

2. The method of removing suspended particles from a gas, which comprises directing a stream of gas at high velocity tangentially into a container at one end thereof so that the gas whirls rapidly about the axis of the container in a generally helical path of progressively decreasing radius, and maintaining a film of liquid as an envelope for the whirling body of gas in close proximity to the outer confines of the said helical path, whereby particles thrown outwardly by the gas are entrapped.

3. The method of removing suspended particles from a gas which comprises rapidly revolving a body of gas about the axis of a container in a generally helical path of progressively decreasing radius to cause particles of solid matter contained therein to be thrown outwardly with progressively increasing force, and maintaining a film of liquid on the inner wall of the container and in close proximity to the outer confines of the said helical path to entrap particles discharged from the gas.

4. The method of removing suspended particles from a gas which comprises rapidly revolving a body of gas about the axis of a container in a generally helical path of progressively decreasing radius to cause particles of solid matter contained therein to be thrown outwardly with progressively increasing force, and introducing water into the container and causing it to flow over the inner surface thereof and in close proximity to the outer confines of the said helical path to entrap particles discharged by the gas.

5. The method set forth in claim 3 in which the water film is caused to move in the same direction of rotation, and about the same axis, as the body of air.

6. Mechanism for removing suspended particles from a gas comprising in combination, a receptacle of progressively decreasing circular cross section, means for introducing a stream of gas adjacent that end of the receptacle which is of larger diameter, revolving it about the axis of the receptacle, and removing it adjacent that end of the receptacle which is of smaller diameter, whereby the gas is caused to move in a generally helical path of progressively decreasing radius, and means for maintaining a film of water upon the inner surface of said receptacle and in close proximity to the outer confines of the said helical path to entrap dust particles discharged from the gas.

7. In a dust collector, in combination, a cylindrical receptacle closed at one end, means for revolving the same about its axis, means for discharging water into said receptacle centrally and adjacent its closed end, and means for discharging a stream of dust laden air tangentially into said receptacle remote from the closed end and withdrawing the same axially therefrom.

8. The method of removing suspended particles from a gas which comprises causing a stream of such gas to move at high velocity about an axis in a generally helical path of progressively decreasing radius, whereby its contained particles are thrown outwardly by centrifugal action with progressively increasing force, maintaining an envelope of liquid around the moving gaseous stream in close proximity to the outer confines of the said helical path to receive and entrap such particles, and causing the liquid constituting such envelope to rotate in the direction of rotational movement of said gas.

9. Mechanism for removing suspended particles from a gas comprising in combination, a receptacle of circular cross section, means for introducing a stream of gas at one point, revolving it about the axis of the receptacle, and removing it at another point, means for maintaining a film of water upon the inner surface of said receptacle to entrap dust particles discharged from the gas, and means for causing the water film to move in the same direction of rotation as the stream of revolving gas.

10. Mechanism for removing suspended particles from a gas comprising in combination, a receptacle of circular cross section, means for introducing a stream of gas at one point, revolving it about the axis of the receptacle, and removing it at another point, means for maintaining a film of water upon the inner surface of said receptacle to entrap dust particles discharged from the gas, and means for revolving the receptacle about the axis thereof.

GARRETT B. LINDERMAN, Jr.